US005570514A

United States Patent [19]

Hashimoto et al.

[11] Patent Number: 5,570,514

[45] Date of Patent: Nov. 5, 1996

[54] DEVICE AND METHOD FOR MEASURING CRIMP HEIGHT

[75] Inventors: Kenji Hashimoto; Nobuyuki Itaya, both of Yokkaichi, Japan

[73] Assignee: Sumitomo Wiring Systems, Ltd., Mie, Japan

[21] Appl. No.: 384,141

[22] Filed: Feb. 6, 1995

[30] Foreign Application Priority Data

Feb. 9, 1994 [JP] Japan .................................... 6-015135

[51] Int. Cl.$^{6}$ ........................................ G01B 5/02

[52] U.S. Cl. .................................. 33/784; 33/833; 33/555

[58] Field of Search .............................. 33/805, 783, 784, 33/833, 837, 549, 555

[56] References Cited

U.S. PATENT DOCUMENTS

| | | | |
|---|---|---|---|
| 4,856,286 | 8/1989 | Yeomans | 29/705 |
| 5,168,736 | 12/1992 | Enneper et al. | 29/705 |
| 5,361,027 | 11/1994 | Selleri | 33/549 |
| 5,375,341 | 12/1994 | College et al. | 33/783 |
| 5,421,101 | 6/1995 | Rank | 33/831 |

FOREIGN PATENT DOCUMENTS

| | | | |
|---|---|---|---|
| 3942219 | 2/1991 | Germany | 33/833 |
| 2051001 | 2/1990 | Japan | 33/833 |
| 2-257001 | 10/1990 | Japan . | |
| 2-261008 | 10/1990 | Japan . | |
| 6-260260 | 9/1994 | Japan . | |

*Primary Examiner*—Thomas B. Will
*Attorney, Agent, or Firm*—Beveridge, DeGrandi, Weilacher & Young, LLP

[57] ABSTRACT

There is disclosed a device and method for measuring a crimp height which eliminates the step of re-holding a wire to readily accomplish the application thereof to an automatic wiring assembly fabricating apparatus. The crimp height measuring device includes: a measuring base for placing thereon a crimp terminal of the wire conveyed in a predetermined wire conveying direction by a wire conveying device holding the wire with the crimp terminal projecting in a direction crosswise to the wire conveying direction; a clamp device adapted to displace to a fixing position allowing the crimp terminal to be clamped on the measuring base and to an open position allowing the crimp terminal to be conveyed in the wire conveying direction; and a control device for displacing the clamp device to the open position to allow the crimp terminal to be conveyed when the wire is conveyed.

7 Claims, 7 Drawing Sheets

DEVICE AND METHOD FOR MEASURING CRIMP HEIGHT

TECHNICAL FIELD OF THE INVENTION

The present invention relates to a device and method for measuring a crimp height and, more particularly, to a device and method for measuring a crimp height optimum for an automatic wiring assembly fabricating apparatus for automatically fabricating wiring harnesses.

RELATED BACKGROUND ART

In general, terminal-crimped wires used for production of wiring harnesses are prepared by stripping an end of a coated wire and then crimping a crimp terminal to the stripped end of the coated wire. The crimp terminal includes a wire barrel portion formed integrally therewith and to be crimped to a core wire of the coated wire, and adapted to electrically connect a terminal portion of a connector housing to the core wire through the wire barrel portion.

The process sequence of fabricating the terminal-crimped wire is automated by an automatic wiring assembly fabricating apparatus. For example, the automatic wiring assembly fabricating apparatus disclosed in Japanese Patent Application No. 5-41448 (1993) comprises a terminal crimping unit and a wire conveying unit for feeding a coated wire to the terminal crimping unit.

The wire conveying unit includes a moving portion for moving the coated wire in a predetermined wire conveying direction, and a plurality of grasping portions spaced apart from each other in the wire conveying direction of the moving portion for grasping the coated wire at the near-end portion thereof. The coated wire grasped by the grasping portions has an intermediate portion sagging into a U-shaped configuration and opposite ends projecting in a direction crosswise to the wire conveying direction of the moving portion.

The terminal crimping unit is disposed to face the projecting ends of the coated wire, and includes a crimping portion for successively crimping crimp terminals to the ends of respective coated wires to fabricate wires to which terminals are crimped.

The crimp state of the crimp terminals crimped by the crimping portion influences the mechanical strength and electrical connection of the wires equipped with terminals and is subjected to strict quality control. For this reason, the height of a crimp portion (hereinafter referred to as "crimp height") of the wire barrel portion of the crimp terminal crimped to the core wire is conventionally measured to detect the crimp state of the crimp terminal.

Such a technique is disclosed, for example, in Japanese Unexamined Patent Publication No. 2-257001 (1990).

This patent publication states that a process for evaluating the crimp state by using the measurement value of the crimp height is relatively easy and has already been put into practical use.

The patent publication also states that the measurement of the crimp height by an operator with a micrometer results in low efficiency.

Thus, the prior art proposes a measuring tool installable in the aforesaid automatic wiring assembly fabricating apparatus. This measuring tool of the prior art includes an impingent stopper and a pair of side guides for positioning a terminal fitting relative to a measuring element; a terminal-crimped wire clamp lever for fixing the terminal-crimped wire; a fixing base having a width smaller than the width of a core wire crimp portion; and a clamp lever and a fixed clamp having inclined surfaces for clamping opposite sides of the core wire crimp portion.

The impingent stopper and side guides are, in plan view, substantially formed into a channel shape open to the tip of the terminal-crimped wire. The terminal-crimped wire clamp lever and the clamp lever are disposed to constantly oppose a core wire crimp portion fixing base and a terminal-crimped wire fixing base by a return spring. When the terminal-crimped wire is conveyed to the impingent stopper and side guides, these levers are operated to provide a spacing between the fixing bases and the levers, and then the terminal and the terminal-crimped wire are inserted into the spacing. Thereafter, the levers are released.

The aforesaid patent publication discloses the technique for causing the terminal-crimped wire to face the measuring element to fix the terminal-crimped wire to the measuring element, but does not disclose the technique for feeding the terminal-crimped wire to be measured to the measuring element. Therefore, the prior art is insufficient to achieve automatic measurement.

Specifically, the impingent stopper and side guides of the prior art are, in plan view, a channel shape open to the tip of the terminal-crimped wire. The terminal-crimped wire clamp lever and the clamp lever are disposed to constantly oppose the core wire crimp portion fixing base and the terminal-crimped wire fixing base by the return spring. Accordingly, it is necessary to cause the terminal-crimped wire to move longitudinally back and forth to position the terminal with respect to the impingent stopper and side guides. Therefore, if the automatic wiring assembly fabricating apparatus employs the measuring tool of the prior art, the grasping portions of the wire conveying unit must once release the terminal-crimped wire and grasp again the terminal-crimped wire after measurement with the grasping portions. The result is the need for inevitably re-holding the terminal-crimped wire when the terminal-crimped wire to be measured is conveyed to the measuring element and when the measured terminal-crimped wire is fed to the subsequent step. This results in complicated construction and control process of the automatic wiring assembly fabricating apparatus.

For the foregoing reason, there is a need for a device and method for measuring a crimp height which does not require the step of re-holding the terminal-crimped wire and hence can easily be applied to the automatic wiring assembly fabricating apparatus.

DISCLOSURE OF THE INVENTION

The present invention is directed to a device and method for measuring a crimp height that satisfy this need.

In accordance with a first mode of the present invention, a crimp height measuring device for use in combination with a wire conveying device in an automatic wiring assembly fabricating apparatus for measuring a crimp height of a crimp terminal crimped to an end of a terminal-crimped wire conveyed in a predetermined wire conveying direction by the wire conveying device, said crimp height measuring device comprising:

- a measuring base for placing thereon the crimp terminal projecting in a direction crosswise to the wire conveying direction with the terminal-crimped wire being conveyed by the wire conveying device;

clamp means adapted to displace to a fixing position allowing the crimp terminal to be fixed on said measuring base and to an open position allowing the crimp terminal to be conveyed in the wire conveying direction;

control means for displacing said clamp means to the open position to allow the crimp terminal to be conveyed when the terminal-crimped wire is conveyed and for displacing said clamp means to the fixing position to fix the crimp terminal to said measuring base when the crimp terminal is placed on said measuring base; and measuring means for measuring the crimp height of the crimp terminal fixed to said measuring base.

In the first mode, the terminal-crimped wire is conveyed in the predetermined wire conveying direction, with the crimp terminal projecting in the direction crosswise to the wire conveying direction, whereby the crimp terminal is placed on the measuring base, and the clamp means fixes the crimp terminal on the measuring base. The crimp height of the fixed crimp terminal is measured by a detecting means. On completion of the measurement of the crimp height, the clamp means is displaced from the fixing position to the open position. This allows the terminal-crimped wire to be conveyed downstream in the wire conveying direction.

In a preferred mode of the present invention, the clamp means includes a first grasping piece which moves from upstream to downstream in the wire conveying direction for displacing from the open position to the fixing position, and a second grasping piece which moves from downstream to upstream in the wire conveying direction for displacing from the open position to the fixing position, and said clamp means grasps a projecting portion of the terminal-crimped wire between said first and second grasping pieces. In this mode, the first and second grasping pieces cooperate with each other to grasp the projecting portion of the terminal-crimped wire, serving to position the crimp terminal and to correct the deformation of the coated wire in case it is deformed by their grasping force. This is advantageous in that the crimp terminal can assuredly be placed on the measuring base in the application of the present invention to the well-known automatic wiring assembly fabricating apparatus.

In another preferred mode of the present invention, the clamp means includes a guide surface for guiding a lower surface of the crimp terminal to be measured onto the measuring base in the course of conveying of the crimp terminal to the measuring base. In this mode, the crimp terminal to be measured is conveyed to the measuring base while being guided by the guide surface, being prevented from failing the conveyance onto the measuring base due to the deformation of the terminal-crimped wire and the warpage of the crimp terminal itself. From this point of view, the present invention is advantageous in that the crimp terminal can assuredly be placed on the measuring base in the application of the present invention to the well-known automatic wiring assembly fabricating apparatus.

In a still another preferred mode of the present invention, the measuring base has a width in the wire conveying direction longer than that of the crimp terminal. In this mode, the dimensional tolerance in the wire conveying direction is accommodated when the wire conveying device stops. This facilitates the application of the present invention to the automatic wiring assembly fabricating apparatus.

In a further preferred mode of the present invention, the aforesaid measuring means includes: a measuring element vertically opposed to said measuring base; a drive mechanism for driving said measuring element upward and downward so that the crimp terminal is pinched between said measuring element and said measuring base; and a measuring mechanism for measuring the crimp height based on the amount of displacement of said measuring element; and wherein said drive mechanism elastically drives said measuring element. In this construction, the crimp terminal fixed on the measuring base is further held between the measuring element and the measuring base, thereby achieving accurate crimp height measurement.

In a still further preferred mode of the present invention, said drive mechanism drives said measuring element at a load permitting a position of the crimp terminal on said measuring base to be correct. This construction can correct the position of the crimp terminal, even if the crimp terminal is in partial contact with the measuring element on the measuring base.

In accordance with another aspect of the present invention, there is provided a method of measuring a crimp height, which comprises the steps of:

causing a crimp terminal of a terminal-crimped wire to project in a direction crosswise to a predetermined wire conveying direction;

conveying the terminal-crimped wire in the wire conveying direction to place the crimp terminal on a measuring base; and halting the conveying of the terminal-crimped wire and measuring the crimp height of the crimp terminal when the crimp terminal is placed on the measuring base.

In this aspect, the known wire conveying device intermittently conveys the terminal-crimped wire in the predetermined wire conveying direction, with the crimp terminal of the terminal-crimped wire projecting in the direction crosswise to the predetermined wire conveying direction, thereby successively conveying the crimp terminals of the terminal-crimped wires to the measuring base for measurement of the crimp height. This facilitates the application of the present invention to the automatic wiring assembly fabricating apparatus employing the known wire conveying device.

BRIEF DESCRIPTION OF THE DRAWINGS

By way of example only, specific embodiments of the present invention will now be described with reference to the accompanying drawings, in which.

DESCRIPTION OF THE PREFERRED EMBODIMENTS

Figure 1:
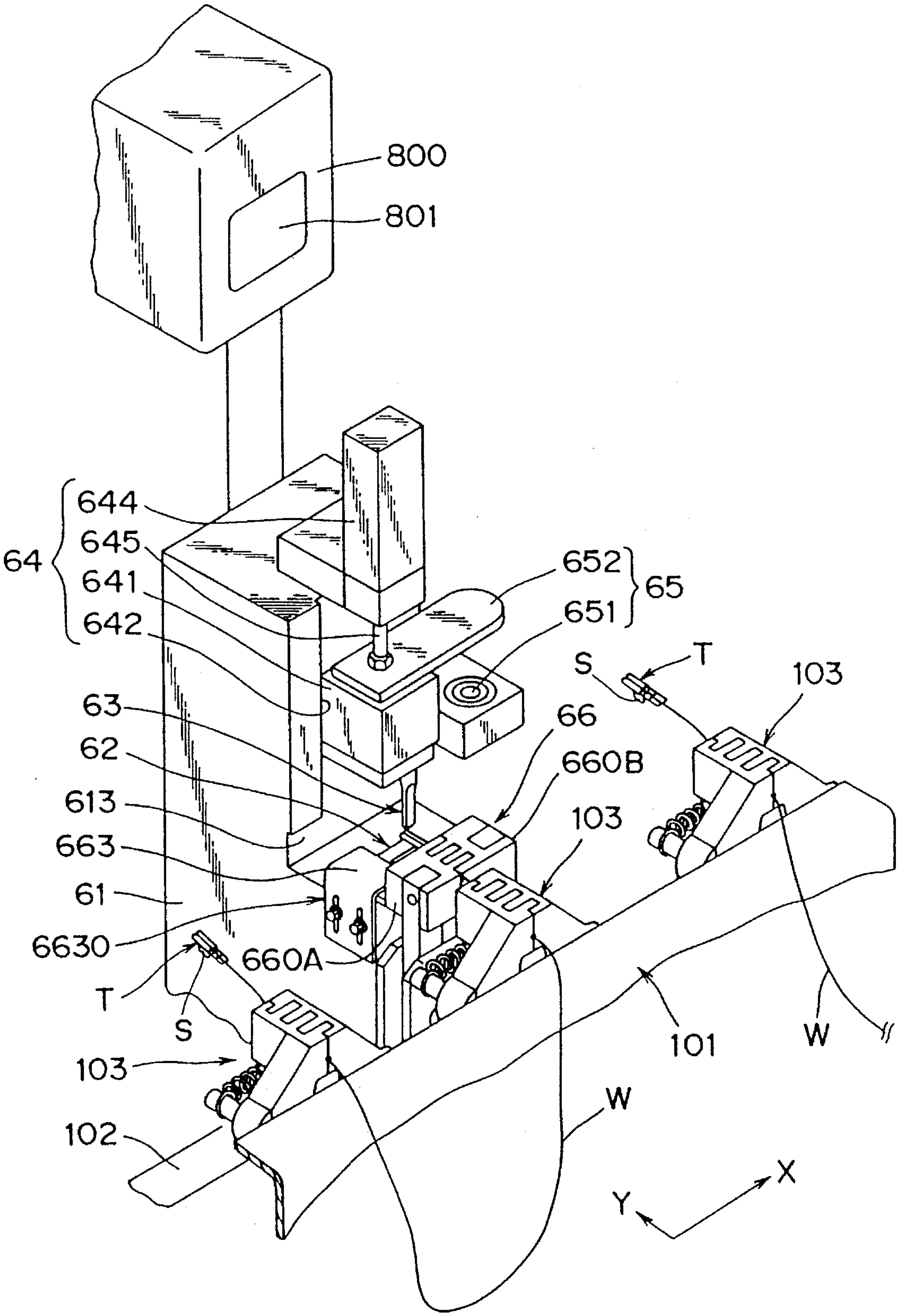
FIG. 1 is a perspective view partially broken away of a crimp height measuring device in use according to a preferred embodiment of the present invention.
Figure 2:
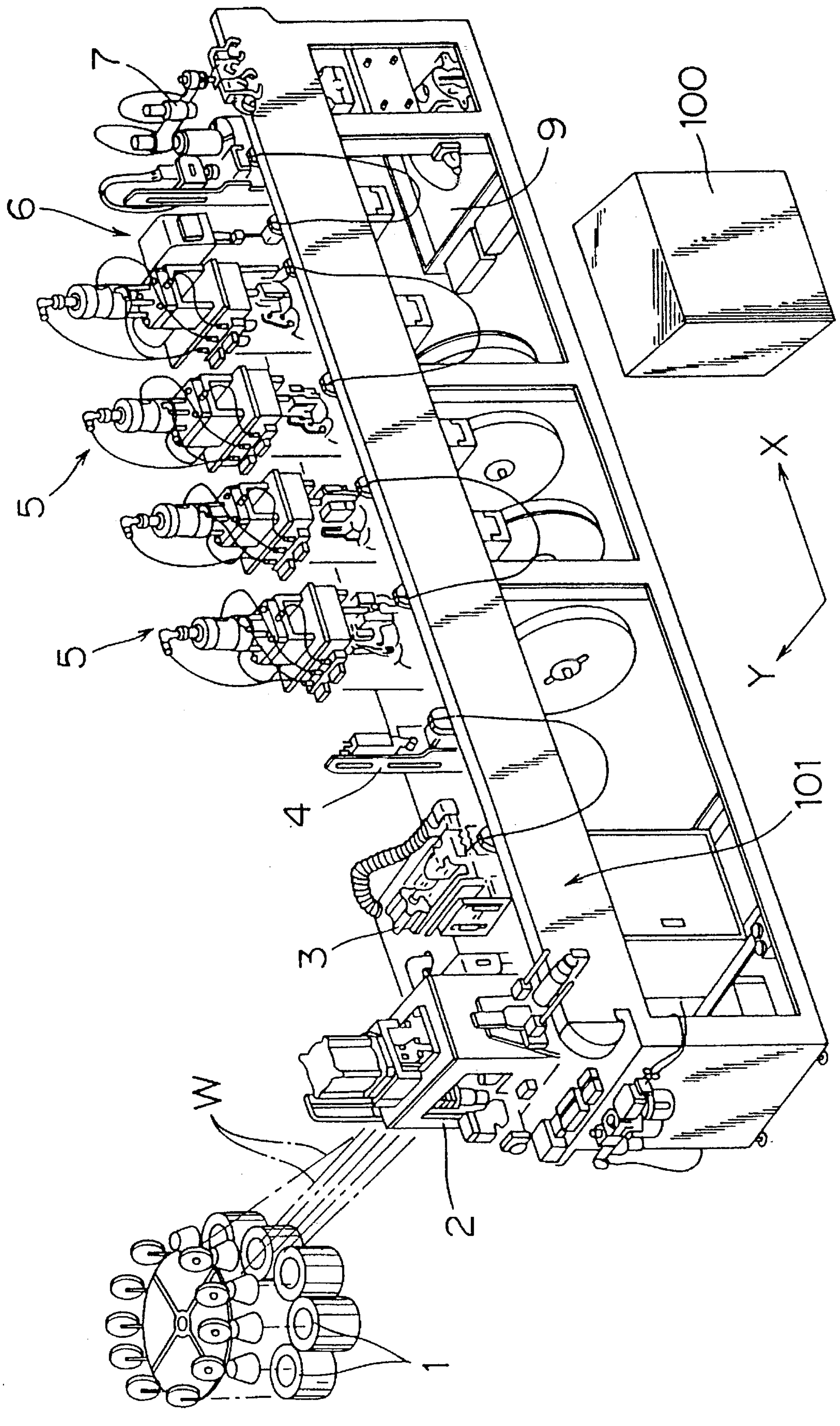
FIG. 2 is a schematic perspective view of major portions of an automatic wiring assembly fabricating apparatus employing the crimp height measuring device.

With reference to FIG. 2, an automatic wiring assembly fabricating apparatus employing the present embodiment comprises a length adjusting device 2 for paying out a coated wire W from a wire web 1, cutting the coated wire W to a predetermined length and sagging the coated wire W into a U-shaped configuration in a predetermined portion. A wire conveying device 101 successively conveys the coated wires W thus cut to the predetermined length. The direction in which the coated wires W are conveyed by the wire conveying device 101 will hereinafter be designated by X. The wire conveying device 101 includes an endless belt 102 (see FIG. 1) and a multiplicity of wire clamps 103 fixed on the outer peripheral surface of the endless belt 102, and conveys the coated wire W in such a manner that the wire clamps 103 pinch opposite ends of the coated wire W with the intermediate portion of the coated wire W being sagged in a U-shaped configuration. The wire clamps 103 are fixed on the endless belt 102 in a predetermined spaced relation along the wire conveying direction X of the endless belt 102, and causes the ends of the coated wire W to project in a direction (hereinafter referred to as "direction Y") perpendicular to the wire conveying direction X of the endless belt 102.

A stripping device 3 is provided at the most upstream in the wire conveying direction X. The stripping device 3 is disposed in opposed relation to the projecting end of the coated wire W, and is designed to strip the end of the coated wire W conveyed by the wire conveying device 101. Provided downstream of the stripping device 3 is a stripping inspecting device 4 for inspecting whether the stripping is defective or non-defective. Provided downstream of the stripping inspecting device 4 are terminal crimping devices 5 for crimping a crimp terminal T selected from a plurality of types of crimp terminals to the stripped portion of the coated wire W. Each terminal crimping device 5 crimps the crimp terminal T to the coated wire W, thereby fabricating a terminal-crimped wire W. A crimp height measuring device 6 which is the feature of this embodiment is provided downstream of the terminal crimping devices 5. For use in combination with the wire conveying device 101 for the automatic wiring assembly fabricating apparatus, as shown, the crimp height measuring device 6 is designed to measure the crimp height of the crimp terminal T crimped to the end of the wire W conveyed in the predetermined wire conveying direction X by the wire conveying device 101. Provided downstream of the crimp height measuring device 6 is a delivering device 7 for delivering the wire W having the crimp terminal T crimped thereto to a terminal-crimped wire connecting device not shown.

In FIG. 2, the reference numeral 100 designates a control section. The control section 100 includes a microprocessor and other electrical equipments, and controls the entire automatic wiring assembly fabricating apparatus.

The wire conveying device 101 is controlled by the control section 100 to intermittently convey the coated wires W. This control section 100 is adapted to halt the ends of the respective coated wires W clamped by the wire clamps 103 to be opposed to the predetermined devices in the direction Y so that the coated wires W can be successively processed.

Figure 3:
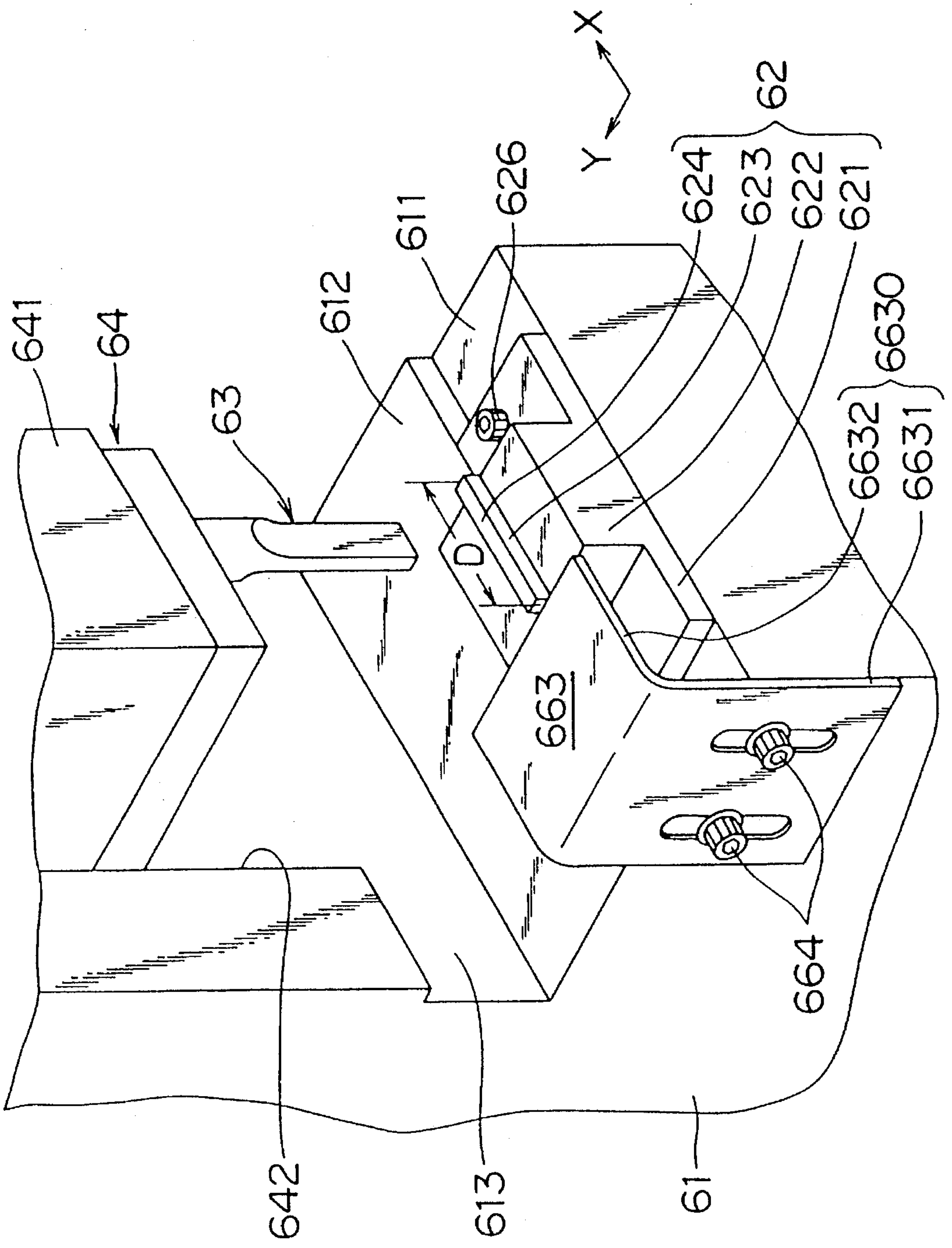
FIG. 3 is a schematic perspective view of major portions of the crimp height measuring device.

Referring now to FIGS. 1 and 3, the crimp height measuring device 6 of this embodiment will be detailed.

The crimp height measuring device 6 comprises a body block 61, a measuring base 62 fixed on a shoulder portion of the body block 61, a measuring element 63 vertically opposed to the measuring base 62, a drive mechanism 64 for vertically driving the measuring element 63 upwardly and downwardly, a measuring mechanism 65 for measuring the crimp height based on the amount of displacement of the measuring element 63, a clamp mechanism 66 for clamping the crimp terminal T when the crimp terminal T is placed on the measuring base 62, and the control section 100 for controlling the clamp mechanism 66.

As best shown in FIG. 3, the body block 61 includes a placing portion 611 for placing the measuring base 62 thereon. The placing portion 611 and a step portion 612 which is higher than the placing portion 611 form a step for locating the measuring base 62 along the wire conveying direction X of the endless belt 102.

The measuring base 62 is placed on the placing portion 611 and is an integral block body including a base portion 621 fixed on the placing portion 611 with bolts 626, a projecting portion 622 having a rectangular configuration in plan view and projecting from a middle portion of the base portion 621, and a placing rib 623 having a rectangular configuration in plan view and projecting from the top of the projecting portion 622. The top surface of the placing rib 623 forms a placing surface 624 for placing the crimp terminal T thereon. The placing surface 624 long extends in the wire conveying direction X and has a width D longer than the width (in the direction X) of the crimp terminal T, thereby absorbing the dimensional tolerance in the wire conveying direction X when the wire conveying device 101 halts as described later.

The measuring element 63 is embodied by a pin with a flatly polished front end. By fixing the measuring element 63 to a grasping block 641 of the drive mechanism 64, the axis of the measuring element 63 is allowed to extend vertically so that the flat front end of the measuring element 63 is opposed to the placing surface 624.

Referring to FIG. 1, the drive mechanism 64 includes a vertical guide 642 formed integrally with the body block 61, and the grasping block 641 is in slidable contact with the vertical guide 642 for upward and downward movement. The grasping block 641 is a block body of a rectangular configuration in plan view and is coupled to a rod 645 of an air cylinder 644. The air cylinder 644 is fixed on an upper surface of a vertical portion 613 forming the vertical guide 642 of the body block 61. Thus, the air cylinder 644 lifts and lowers the measuring element 63 through the grasping block 641 and is adapted to elastically pinch a crimp portion of the crimp terminal T between the measuring element 63 and the placing surface of the measuring base 62 when the measuring element 63 is lowered. In this embodiment, the measuring element 63 is driven by the air pressure of the air cylinder 644, so that there is an advantage in that the placing surface 624 and the measuring element 63 are prevented from severely damaging the surface of the crimp terminal T even if the air pressure is set to the load which can correct the position of the crimp terminal T placed on the placing surface 624 of the measuring base 62 in case the crimp terminal T is skewed and partially contacts the measuring element 63.

The measuring mechanism 65 includes a sensor 651 fixed to the vertical portion 613 of the body block 61, and a bracket 652 to be sensed which is fixed to the grasping block 641 of the drive mechanism 64 and opposed to the sensor 651. The sensor 651 includes a light emitting element and a light receiving element, and is a well known sensor for calculating a mechanical distance, for example, by the trigonometry technique. That is, the sensor 651 detects an altitudinal position of the measuring element 63 when the crimp terminal T is pinched between the measuring element 63 and the placing surface 624 of the measuring base 62 with respect to a reference position in which the measuring element 63 is in contact with the placing surface 624 of the measuring base 62, and then calculates the distance from the altitude position to the reference position to precisely determine the crimp height of the crimp terminal T. In this embodiment, there is provided an indicator 800 behind the crimp height measuring device 6 for indicating the crimp height measured by the measuring mechanism 65. The indicator 800 includes a display 801 for displaying the crimp height.

The clamp mechanism 66 of this embodiment will be described in detail with reference to FIGS. 1 and 4.

The clamp mechanism 66 comprises first and second grasping pieces 660A and 660B which are displaceable to an open position (see FIG. 5) allowing the crimp terminal T to be conveyed in the wire conveying direction X by releasing the terminal-crimped wire when the terminal-crimped wire W is conveyed and which are displaceable to a fixing position (see FIGS. 1 and 4) allowing the crimp terminal T to be clamped to the fixing position by grasping the terminal-crimped wire W when the crimp terminal T is placed on the measuring base 62.

Figure 4:
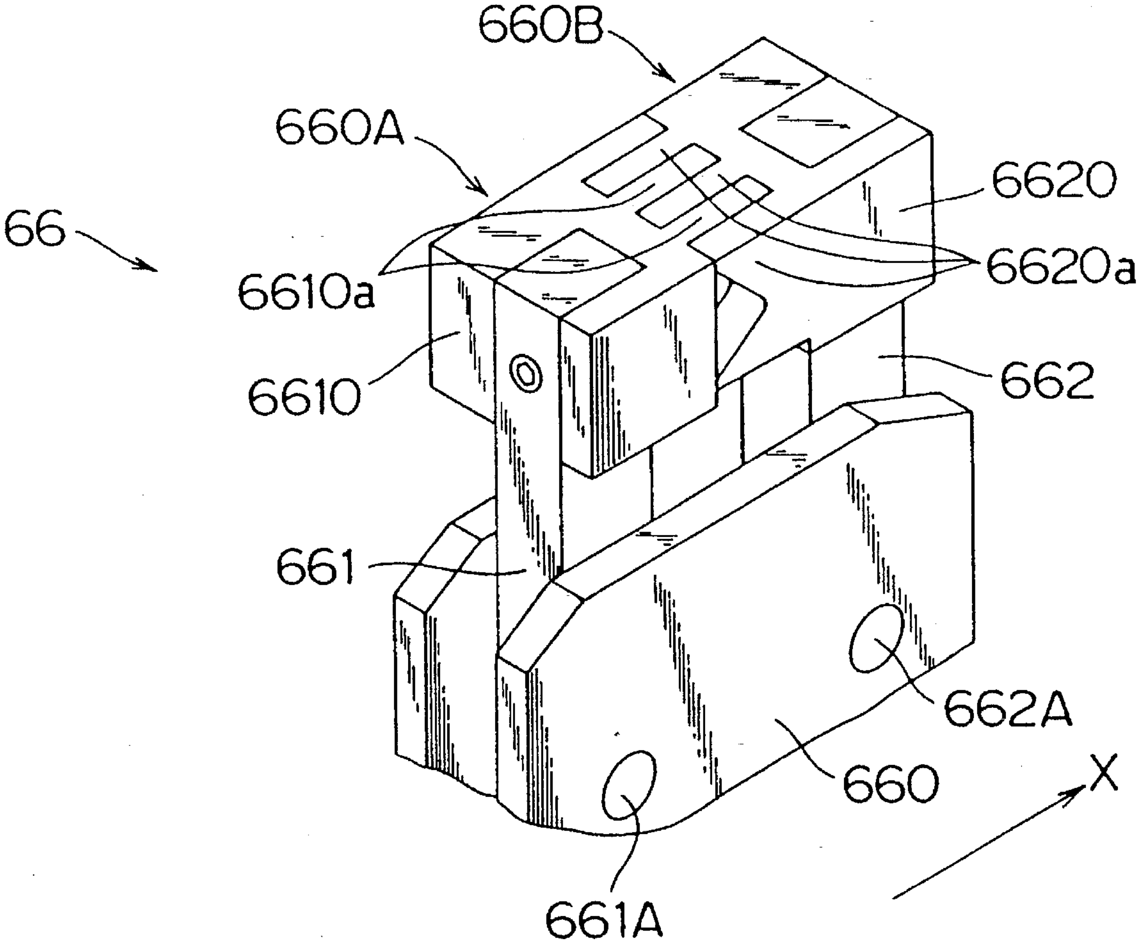
FIG. 4 is a schematic perspective view of a clamp mechanism in a fixing position for the crimp height measuring device.

The first grasping piece 660A is designed to move from upstream to downstream in the wire conveying direction X, thereby to be displaced from the open position (the position shown in FIG. 5) to the fixing position (the position shown in FIG. 4). On the other hand, the second grasping piece 660B is designed to move from downstream to upstream in the wire conveying direction X, thereby to be displaced from the open position to the fixing position.

More specifically, the clamp mechanism 66 of this embodiment includes an actuator unit 660 for driving the first and second grasping pieces 660A and 660B. The actuator unit 660 includes support shafts 661A and 662A, and a pair of arm members 661 and 662 respectively supported by the support shafts 661A and 662A. The actuator unit 660 drives the pair of arm members 661 and 662 into a vertical position shown in FIG. 4 and a horizontal position shown in FIG. 5. Comb teeth clamps 6610 and 6620 are integrally fixed to the arm members 661 and 662, respectively. The comb teeth clamps 6610 and 6620 respectively include a multiplicity of comb teeth 6610*a* and 6620*a* facing and open to each other in a "doglegged" configuration. One arm member 661 and the comb teeth clamp 6610 fixed thereto form the first grasping piece 660A, and the other arm member 662 and the comb teeth clamp 6620 fixed thereto form the second grasping piece 660B.

The comb teeth 6610*a* (6620*a*) of one comb teeth clamp 6610 (6620) are spaced apart from each other such that the respective comb teeth 6610*a* (6620*a*) are fitted between two adjacent comb teeth 6620*a* (6610*a*) of the other comb teeth clamp 6620 (6610). When the actuator unit 660 drives the pair of arm portions 661 and 662 into the vertical position shown in FIG. 4, the comb teeth 6610*a* (6620*a*) of one comb teeth clamp 6610 (6620) are adapted for meshing engagement with the comb teeth 6620*a* (6610*a*) of the other comb teeth clamp 6620 (6610) to hold the terminal-crimped wire W therebetween.

In this embodiment, the support shafts 661A and 662A of the arm members 661 and 662 are set so that the comb teeth 6610*a* and 6620*a* are opened in a position lower than the endless belt 102 when the grasping pieces 660A and 660B are displaced in the open position. This provides an opened path for conveying the crimp terminal T in the wire conveying direction X, thereby permitting the crimp terminal T to be conveyed to the measuring base 62 through above the comb teeth 6610*a* and to be moved downstream of the crimp height measuring device 6 through above the comb teeth 6620*a*.

Although not shown in detail, the comb teeth clamps 6610 and 6620 of the grasping pieces 660A and 660B preferably include clamp pieces formed integrally therewith for clamping the sides of the crimp terminal T in the aforesaid fixing position. The clamp pieces, if provided, hold the crimp terminal T from its opposite sides therebetween to correct the deformation of the crimp terminal T. This is advantageous in that the measuring accuracy is improved and measurement errors are assuredly prevented when the known automatic wiring assembly fabricating apparatus employs the crimp height measuring device 6.

Figure 6:
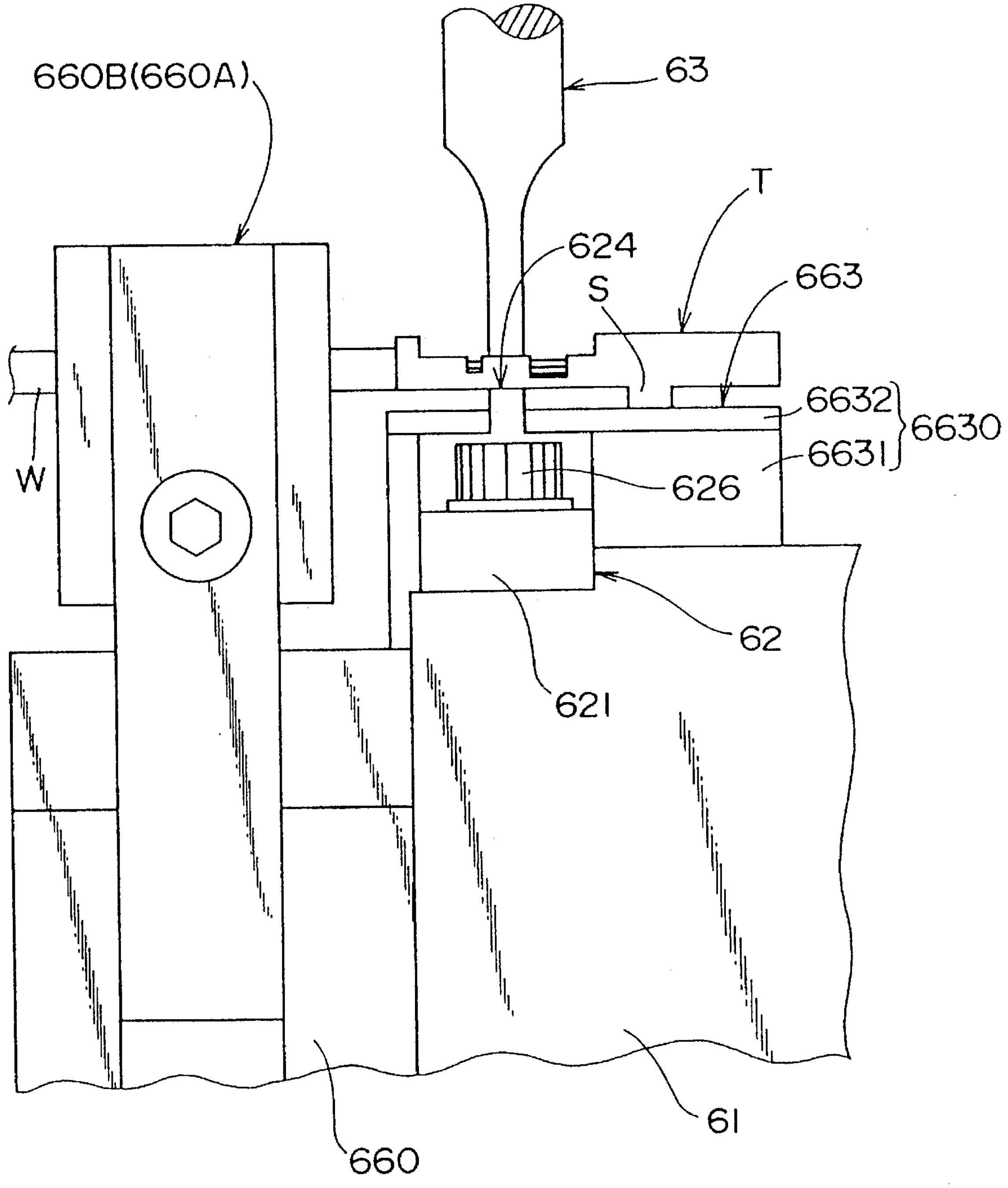
FIG. 6 is a schematic side view of major portions of the crimp height measuring device.

With reference to FIGS. 1, 3 and 6, the clamp mechanism 66 of this embodiment includes a guide surface 663 for guiding the lower surface of a stabilizer S of the crimp terminal T to be measured onto the measuring base 62 in the course of the conveying of the crimp terminal T to the measuring base 62. The guide surface 663 is embodied by a cover 6630 fixed to the body block 61 with bolts 664. As best shown in FIG. 3, the cover 6630 is an integral metal plate product including a fixed portion 6631 fixed on the vertical portion 613 formed on its side surface upstream in the wire conveying direction X, and a horizontal portion 6632 extending horizontally downstream in the wire conveying direction X from an upper end of the fixed portion 6631. As best shown in FIG. 3, the horizontal portion 6632 covers the base portion 621 of the measuring base 62 from above and extends flush with the placing surface 624 on the same horizontal plane such that the front portion of the horizontal portion 6632 is disposed adjacent the placing surface 624. The upper surface of the horizontal portion 6632 forms the guide surface 663.

Although not shown in detail, it is desirable to provide a pushing member fixed on the first grasping piece 660A for forcing the crimp terminal T against the guide surface 663 in the course of the displacement from the open position to the fixing position. It is further desirable that the pushing member is capable of forcing the crimp terminal T placed on the measuring base 62 against the measuring base 62. Such arrangements can correct the warpage of the crimp terminal T itself, and assuredly position the crimp terminal T on the placing surface 624.

Control means for controlling the clamp mechanism 66 is embodied by the control section 100 of the automatic wiring assembly fabricating apparatus.

Figure 7:
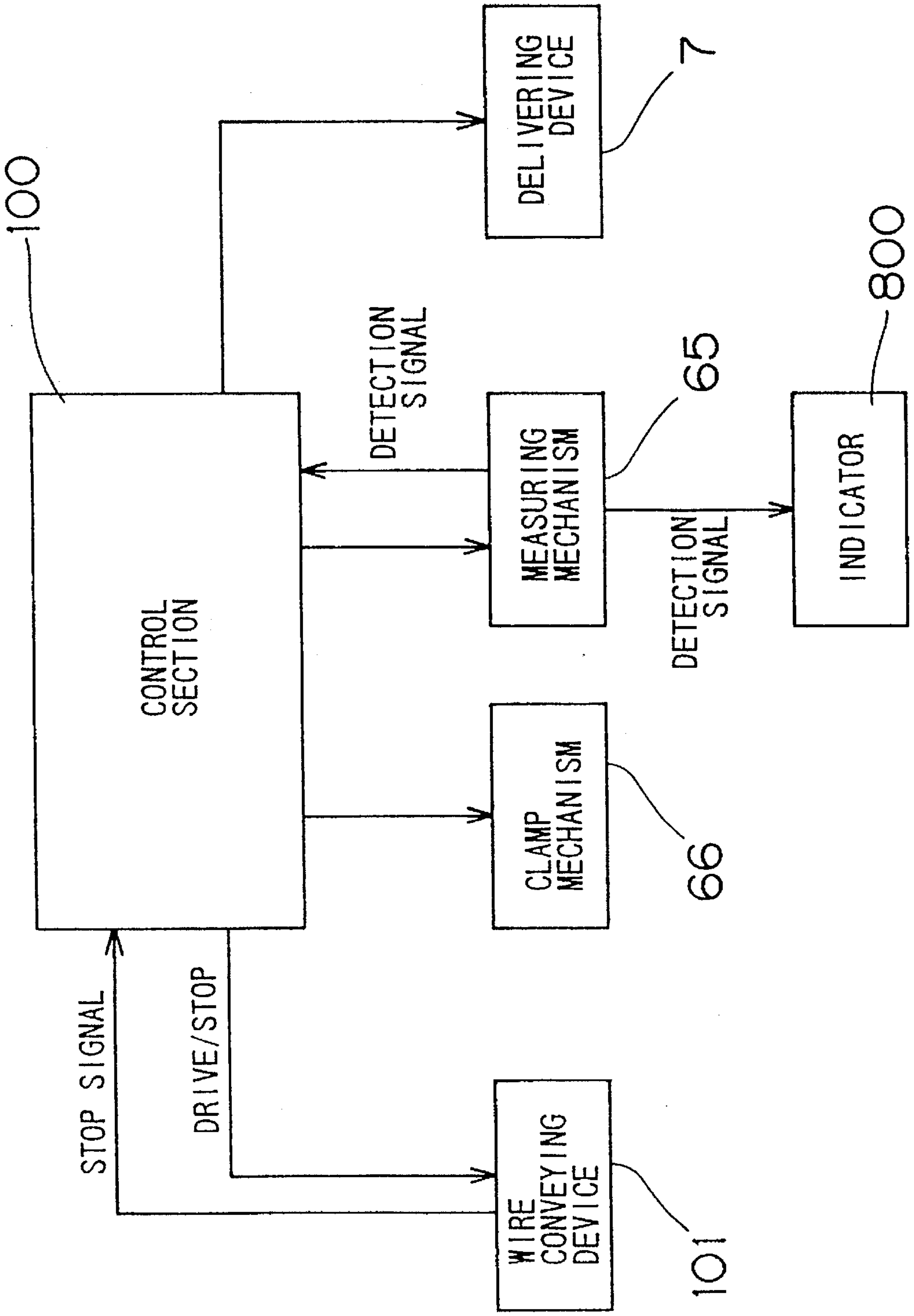
FIG. 7 is a schematic block diagram of a control section of the crimp height measuring device.

As shown in FIG. 7, the control section 100 receives a stop signal from a stop signal outputting circuit in the wire conveying device 101, and controls the wire conveying device 101 for intermittent conveying in response to the stop signal.

The control section 100 is connected to the clamp mechanism 66, and is adapted to drive the actuator unit 660 in predetermined timing.

Further, the control section 100 controls the delivering device 7 based on a detection signal from the measuring mechanism 65, so that the terminal-crimped wire W having a crimp terminal T out of standard specification is prevented from being supplied to the subsequent step.

The microprocessor in the control section 100 stores therein standard crimp heights for respective types of crimp terminals to be crimped. The control section 100 compares the measured crimp height with the standard crimp height based on the detection signal detected by and sent from the measuring mechanism 65. If the measured crimp height is out of standard specification, the control section 100 outputs a signal to the delivering device 7 to control the delivering device 7 so as to remove the terminal-crimped wire W having the off-specification crimp terminal T from the subsequent step. Specifically, the delivering device 7 stops without grasping the terminal-crimped wire W having the off-specification crimp terminal T. Consequently, the wires W with the off-specification terminals are collected in a receiver box 9 disposed at the turn of the endless belt 102 as shown in FIG. 2.

Operation according to this embodiment will hereinafter be described with reference to FIGS. 1, 4 and 5.

Figure 5:
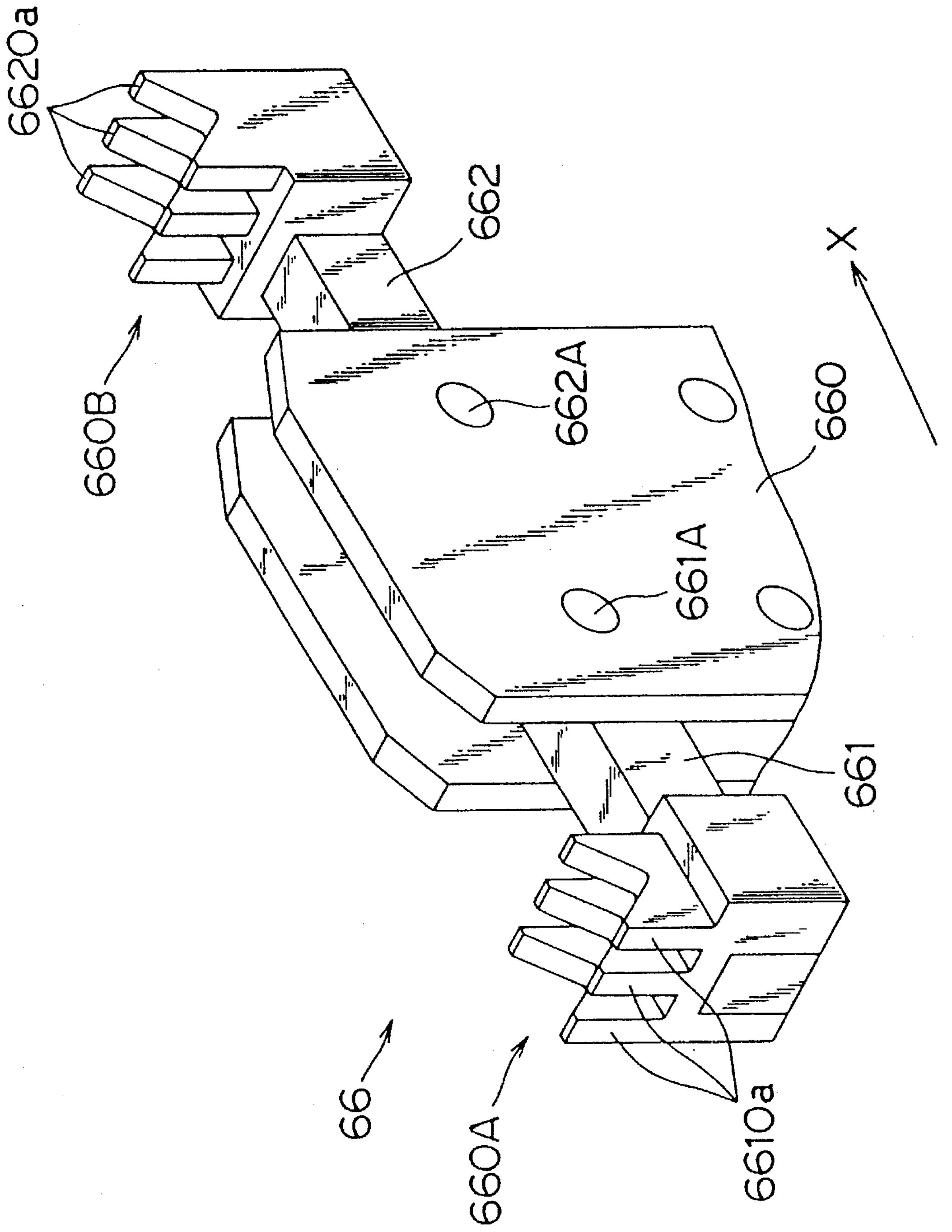
FIG. 5 is a schematic perspective view of the clamp mechanism in an open position for the crimp height measuring device.

In an initial state, the grasping pieces 660A and 660B of the clamp mechanism 66 are displaced to the open position shown in FIG. 5 and allow the crimp terminal T to be conveyed onto the measuring base 62 in the wire conveying direction X.

In this state, as the wire conveying device 101 conveys the terminal-crimped wire W, the crimp terminal T is conveyed to the crimp height measuring device 6 while being held perpendicular to the wire conveying direction X. In this step, the crimp terminal T is conveyed to the placing surface 624 of the measuring base 62 while being guided by the cover 6630 fixed on the body block 61. The endless belt 102 once stops when the wire clamp 103 is just opposed to the measuring base 62 in the direction Y.

As the endless belt 102 stops, the control section 100 drives the actuator unit 660 in the clamp mechanism 66 to displace the pair of grasping pieces 660A and 660B from the open position shown in FIG. 5 to the fixing position shown in FIG. 1.

This permits a near-end portion of the terminal-crimped wire W to be held and rigidly fastened between the comb teeth 6610*a* and 6620*a* of the grasping pieces 660A and 660B. In this step, the first grasping piece 660A may guide the crimp terminal T along the guide surface 663 of the cover 6630. That is, if conveyed only by the conveying force of the wire conveying device 101, the crimp terminal T which projects without restraint would tend to be left behind on the upstream side in the wire conveying direction X. However, by holding the terminal-crimped wire W between the first and second grasping pieces 660A and 660B as previously described, the crimp terminal T which would otherwise be left behind on the upstream side can assuredly be placed onto the placing surface 624 of the measuring base 62.

Once the crimp terminal T is placed on the placing surface 624, the control section 100 actuates the air cylinder 644 of the drive mechanism 64 to lower the measuring element 63 through the grasping block 641. Then, the crimp portion of the crimp terminal T is held between the measuring element 63 and the measuring base 62, and the crimp height of the crimp terminal T is measured.

The measured crimp height is output to the control section 100 and the indicator 800. The indicator 800 indicates the crimp height, and the control section 100 compares the measurement value with the preliminarily stored standard value to judge whether the crimp terminal T is acceptable or unacceptable as described above.

When the measurement of the crimp height is completed, the measuring element 63 is lifted up and the actuator unit 660 of the clamp mechanism 66 is driven again to displace the pair of grasping pieces 660A and 660B from the fixing position shown in FIGS. 1 and 4 to the open position. This allows the crimp terminal T to be released again for conveying in the wire conveying direction X. Then, the wire conveying device 101 is driven again for the next intermittent conveying, and the foregoing process sequence is repeated.

As described above, this embodiment allows the crimp terminal T to be conveyed in the wire conveying direction X of the terminal-crimped wire W, whereby the measurement of the crimp height of the crimp terminal T can be carried out with the crimp terminal T projecting in the direction (direction Y) crosswise to the conveying direction of the terminal-crimped wire W. Therefore, the application of this embodiment to the aforesaid known automatic wiring assembly fabricating apparatus for measurement of the crimp height enables the measuring process to be carried out with the terminal-crimped wire W being held by the wire conveying device 101, and also allows the terminal-crimped wire W after the measurement to be fed in the wire conveying direction X to the subsequent step.

The result is the effect of simplifying the structure and control operation for conveying the terminal-crimped wire W to be measured to the measuring base 62 and feeding the terminal-crimped wire W after the measurement to the subsequent step.

In accordance with this particular embodiment, since the first and second grasping pieces 660A and 660B cooperate with each other to grasp the projecting portion of the terminal-crimped wire W for measurement of the crimp height, the grasping pieces 660A and 660B serve not only to position the crimp terminal T but also to correct the deformation of the coated wire W in case it is deformed by the grasping force thereof. This is advantageous in that the crimp terminal T can assuredly be placed on the measuring base 62 in the application of this embodiment to the automatic wiring assembly fabricating apparatus well known in the art.

Further, this embodiment is designed so that the crimp terminal T to be measured is conveyed to the measuring base 62 while being guided by the guide surface 663 of the cover 6630, thereby preventing a failure in conveying to the measuring base 62 due to the curling of the terminal-crimped wire W and the warpage of the crimp terminal T itself. From this point of view, this embodiment is advantageous in that the crimp terminal T can assuredly be placed on the measuring base 62 in the application of this embodiment to the automatic wiring assembly fabricating apparatus known in the art.

In addition, this embodiment permits the dimensional tolerance in the wire conveying direction X to be accommodated when the conveying operation stops, thereby facilitating the application of this embodiment to the automatic wiring assembly fabricating apparatus.

Furthermore, this embodiment is adapted so that the well known wire conveying device 101 successively conveys the crimp terminals T of the terminal-crimped wires W for measurement of the crimp height by intermittently conveying the terminal-crimped wires W in the predetermined wire conveying direction X. This facilitates the application of this embodiment to the automatic wiring assembly fabricating apparatus employing such a wire conveying device 101.

Thus, this embodiment eliminates the step of re-holding the terminal-crimped wire W, thereby readily applied to the automatic wiring assembly fabricating apparatus.

Though the present invention has been described in detail by way of the foregoing embodiment merely for the purpose of illustration of the technical description thereof, it should be understood that the specific embodiment does not pose any limitation to the present invention. Accordingly, the spirit and scope of the present invention are to be limited only by the terms of the appended claims.

What is claimed is:

1. A crimp height measuring device for use in combination with a wire conveying device in an automatic wiring assembly fabricating apparatus for measuring a crimp height of a crimp terminal crimped to an end of a terminal-crimped wire conveyed in a predetermined wire conveying direction by the wire conveying device, said crimp height measuring device comprising:

a measuring base for placing thereon the crimp terminal projecting in a direction crosswise to the wire conveying direction with the terminal-crimped wire being conveyed by the wire conveying device;

clamp means adapted to displace to a fixing position wherein said clamp means clamps the terminal-crimped wire so that the crimp terminal is placed for measurement on said measuring base, and adapted to displace to an open position wherein said clamp means does not clamp the terminal-crimped wire so that the crimp terminal can be conveyed in the wire conveying direction;

control means for displacing said clamp means to the open position to allow the crimp terminal to be conveyed when the terminal-crimped wire is conveyed and for displacing said clamp means to the fixing position to fix the crimp terminal to said measuring base when the crimp terminal is placed on said measuring base; and measuring means for measuring the crimp height of the crimp terminal fixed to said measuring base.

2. A crimp height measuring device as set forth in claim 1, wherein said clamp means includes a first grasping piece which moves from upstream to downstream in the wire conveying direction for displacing from the open position to the fixing position, and a second grasping piece which moves from downstream to upstream in the wire conveying direction for displacing from the open position to the fixing position, and said clamp means grasps a projecting portion of the terminal-crimped wire between said first and second grasping pieces.

3. A crimp height measuring device as set forth in claim 1, wherein said clamp means includes a guide surface for guiding a lower surface of the crimp terminal to be measured onto said measuring base in the course of conveying of the crimp terminal to said measuring base.

4. A crimp height measuring device as set forth in claim 1, wherein said measuring base has a width in the wire conveying direction longer than that of the crimp terminal.

5. A crimp height measuring device as set forth in claim 1, wherein said measuring means includes:

a measuring element vertically opposed to said measuring base;

a drive mechanism for driving said measuring element upwardly and downwardly so that the crimp terminal is pinched between said measuring element and said measuring base; and a measuring mechanism for measuring the crimp height based on the amount of displacement of said measuring element; and wherein said drive mechanism elastically drives said measuring element.

6. A crimp height measuring device as set forth in claim 5, wherein said drive mechanism drives said measuring element at a load for correcting a position of the crimp terminal on said measuring base.

7. A method of measuring a crimp height of a crimp terminal of a terminal-crimped wire by using a measuring base and a clamp means adapted to displace to a fixing position wherein said clamp means clamps the terminal-crimped wire so that the crimp terminal is placed on said measuring base, and adapted to displace to an open position wherein said clamp means does not clamp the terminal-crimped wire so that the crimp terminal can be conveyed in a wire conveying direction, said method comprising the steps of:

causing the crimp terminal of the terminal-crimped wire to project in a direction crosswise to said wire conveying direction;

displacing said clamp means to said open position;

conveying the terminal-crimped wire in the wire conveying direction to place the crimp terminal on said measuring base;

halting the conveying of the terminal-crimped wire at said clamp means;

displacing said clamp means to said fixing position; and measuring the crimp height of the crimp terminal with the crimp terminal placed on said measuring base.

* * * * *